Aug. 20, 1957     W. N. STANTON     2,803,789
POWER TRANSMISSION
Filed Jan. 4, 1954

INVENTOR.
WARREN N. STANTON
BY Clement J. Paynoskar
ATTORNEY

United States Patent Office 2,803,789
Patented Aug. 20, 1957

2,803,789

POWER TRANSMISSION

Warren N. Stanton, Shrewsbury, Mass., assignor to Vickers, Incorporated, Detroit, Mich., a corporation of Michigan Application January 4, 1954, Serial No. 401,815

7 Claims. (Cl. 317—191)

This invention relates to power transmission and more particularly to electromagnetic translating devices. The type of electromagnetic translating device contemplated herein has relatively movable magnetic stator and armature members excited by an electric coil, which produces a magnetic field that causes magnetic attraction between the armature and stator, drawing the armature to the stator.

One example of such a translating device is what is commonly known as a solenoid. Solenoids have plunger type armatures that may be used to operate many devices requiring mechanical actuation, for example certain types of hydraulic valves. In the latter case a valve rod may be in contact with the plunger of the solenoid and actuated by the movement of the plunger.

In most electromagnetic translating devices the magnetic structure of the armature and sometimes the stator are required to take operational shocks, such as through impacts which tend to deform the member receiving the shock. This is especially true in A. C. solenoids where the magnetic structure is made of laminated magnetic material.

It has been known to provide hard inserts in the impact end of solenoid plungers; however, shortened life due to inserts loosening and falling out of their sockets after a relatively small number of impacts has been a major problem.

In accordance with the present invention a magnetic member of an electromagnetic translating device is formed with a cavity having an opening in a face of the member in which cavity a hard shock receiving member is restrained from falling out by the contour of the cavity walls which overlap a portion of the shock member.

It is therefore an object of the present invention to provide an electromagnetic translating device with a hard shock receiving member which is restrained from falling out of its cavity by the contour relations of the cavity walls and the shock member.

Another object is to provide a solenoid plunger, in which a hard shock receiving member is restrained from falling out of its cavity by the contour relations of the cavity walls and the shock member.

Further objects and advantages of the present invention will be apparent from the following description, reference being had to the accompanying drawings wherein a preferred form of the present invention is clearly shown.

Figure 1:
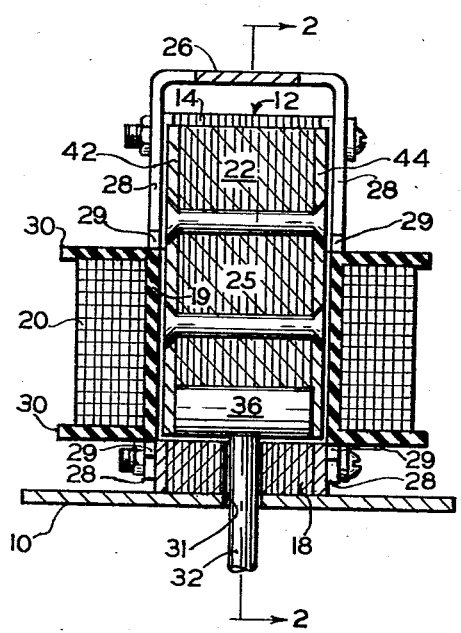
Fig. 1 is a vertical section in a plane parallel to the front elevation of a solenoid embodying the present invention. This view is in a plane which cuts the solenoid into two symmetrical halves, except for some rivets and the shock member which are shown in full.

As shown in the drawings a solenoid is provided with a base 10 on which is mounted a generally C-shaped magnetic stator 12 having parallel arms 14 and 16 at opposite ends of an intermediate member 18. A bobbin 19, carrying an electric coil 20, which may be energized from any suitable electric current source (not shown), is positioned between the parallel arms 14 and 16. A T-shaped plunger type armature 22 with side arms 23 and 24, has a shank 25 which reciprocates in the aperture of the coil bobbin 19. The stator 12 and the armature 22 may be made of any suitable magnetic material, for example, silicon steel laminations bound together by any suitable means, such as welds, rivets, etc. In the example shown the laminations are secured together with rivets.

Figure 2:
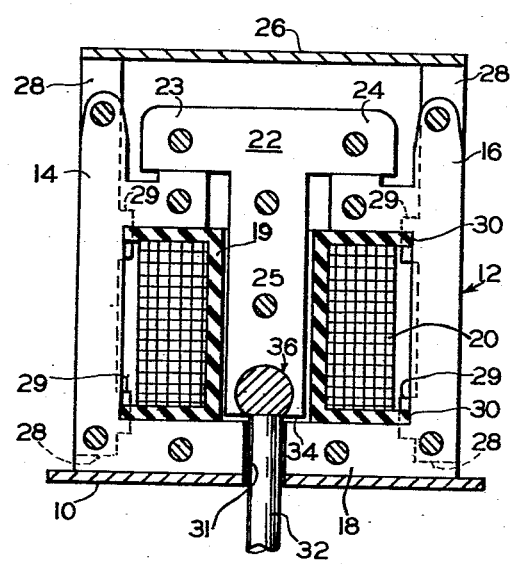
Fig. 2 is a vertical section of the same solenoid taken at right angles to the section of Fig. 1 on the line 2—2 of that figure. The plane of this view cuts the solenoid into two symmetrical halves.

When the coil 20 is energized magnetic attraction forces the plunger downward to its lowermost position, which is the position shown in the drawings. The upward movement of the armature 22 may be limited by a suitable bumper 26 having four legs 28 (only two legs shown in each of Figs. 1 and 2) secured to the stator arms 14 and 16. The legs 28 are provided with integral tabs 29 which fit in slots formed in the flanges 30 of the coil bobbin 19, thus holding the coil against lateral movement. Although it is customary to provide metal guides between the plunger and the walls defining the coil bobbin aperture, they are not shown to avoid complicating the drawing.

An aperture 31 is provided through the base 10 and the intermediate member 18 for receiving the end of a reciprocable rod 32 for actuation thereof by the armature 22. The rod 32 may be connected to any device requiring mechanical actuation, for example a valve.

Figure 3:
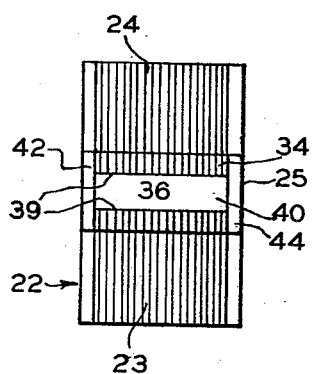
Fig. 3 is a full bottom view of the plunger only in the solenoid of Fig. 1.

It will be noted that the upper end of the rod 32 is in contact with a surface 34 formed at the bottom of the armature shank 25. In order to prevent deformation of the armature shank 25 due to operational shock through contact with the rod 32, a substantially non-deformable shock receiving member in the form of a hard insert 36 is provided in the end of the shank 25 to contact the rod 32 and receive the operational shock. The insert 36 is fixed in a cavity provided in and open to the surface 34 at the end of the armature shank 25. The cavity is defined by side walls 38 in the armature shank 25 and below the surface 34. A full view of the surface 34 is shown in Fig. 3 which also shows the defining edges 39 of the mouth of the cavity and the contact face 40 of the insert 36. The contour of the cavity walls 38 is such that portions of the walls overlap portions of the insert 36 to prevent the insert from falling out of the cavity.

In the particular embodiment shown this contour and overlap is provided by portions 41 of the cavity walls which project inwardly toward each other at the top or mouth of the cavity. The inward projection of the cavity walls at the mouth of the cavity partially overlaps the insert 36 in such manner as to prevent the insert 36 from falling out of the cavity. An inward projection of cavity walls, regardless of whether it is cut, cast, machined or otherwise fabricated, may be conveniently referred to as an undercut or an overhang of the cavity walls, and portions of the insert 36 may be said to extend behind the undercut or under the overhang.

Although it is preferred that the shape of the insert 36 conform with the contour of the cavity walls to substantially fill the cavity, enough clearance may be allowed between the surfaces of the insert and the cavity walls to permit molten silver solder or other suitable bonding material to flow therebetween and secure a bond. In the case of silver soldering good results have been obtained with clearances running from .003 to .005 of an inch. It is also preferred to dimension the insert and the extent of the overlap thereof by the overlapping wall portions, so that regardless of its configuration and orientation in the cavity, in case it becomes loosened, the insert cannot fall out of the cavity.

Figure 4:
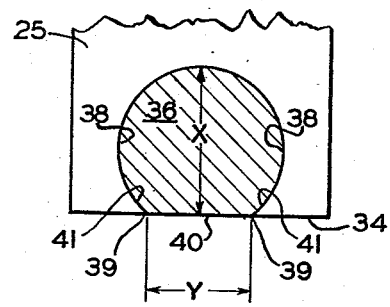
Fig. 4 is an expanded view of part of Fig. 2, showing only the lower end of the plunger shank.

In the illustrated embodiment of the invention, the cavity is a groove formed in the surface 34 and crosswise of the laminae. The defining walls of the groove provide a groove with a cross-section in the plane of the laminae (the plane of the drawing Figs. 2 and 4) that is a segment of a circle larger than a semicircle, and having a discontinuity that is the mouth or top of the groove. The groove may be formed by cutting the proper shape in the individual laminations before they are assembled together, and may extend across all or part of the laminae. In the illustration the groove has a uniform cross-section from end to end and extends to and ends at the side plates 42 and 44 of the armature 22. The latter construction permits all the laminae to be cut alike, and the side plates prevent the insert from sliding in the groove crosswise of the laminations.

The shock member 36, for the example shown, was fabricated from a round rod, cut to the proper length and fitted into the groove before the side plates 42 and 44 were assembled with the stack of laminations. Depending on the desired contact with the rod 32, the face 40 of the insert 36 which contacts the end of the rod 32 may be rounded, concave, or ground flat, below, above, or flush with the surface 34.

The dimensions of the shock member are such that if it is loose in the cavity, it will not pass out of the mouth of the groove even if it rotates within the groove. For the general case, regardless of the configuration of the insert and cavity walls, and in any particular orientation, the insert will not fall out of the cavity if, in the plane of Fig. 4, the shortest distance across the cavity between the cavity wall portions which overlap portions of the insert, is less than the greatest distance across the insert in the same direction. For example, in the circular configuration shown, this is easily attained by making the distance X between the center of the face 40 and the backside of the insert 36 greater than the distance Y across the mouth of the groove. Thus, if the insert 36 rotates 90° from the position shown the overlap of the cavity walls will be sufficient to prevent it from falling out. Where the circular insert has a flat contact face the distance X is the height of the segment of the circle representing the cross-section of the shock member.

Preferably the hard shock member 36 should be less deformable than the part of the plunger which it protects from direct impact and other shock. Any suitable substantially nondeformable material may be used for the shock member 36. For example, it may be made of hardened tool steel, Stellite, or any other suitable material that will withstand repeated operational impacts or other shocks, without serious deformation. One example of hardened tool steel which was used with marked success was an 18-4-2 type with the following percentage analysis: Carbon .8; chromium 4.0; tungsten 18.5; vanadium 2.0; molybdenum .75; and the balance iron.

The invention is not confined to the particular configurations shown, and may be practiced by any related configurations of shock member and cavity walls which provide portions of the cavity walls that overlap portions of the shock member to prevent the shock member from falling out of the cavity.

While the form of embodiment of the invention as herein disclosed constitutes a preferred form, it is to be understood that other forms might be adopted, all coming within the scope of the claims which follow.

What is claimed is as follows:

1. An electromagnetic translating device comprising relatively movable stator and armature members, at least one of said members comprising a laminate ferromagnetic structure subject to receive an operational mechanical shock, said ferromagnetic structure having a surface formed by laminae edges and walls below said surface defining a groove with an opening in said surface and extending crosswise of the laminae, said walls having an undercut below said opening, and a substantially non-deformable shock member for receiving said shock fixed in said cavity and extending under said undercut.

2. A plunger for use in an electromagnetic solenoid, said plunger comprising a laminated structure having a surface formed by lamina edges, arcuate walls below said surface defining a groove formed in and open to said surface, said arcuate walls having portions projecting toward each other at the mouth of the groove and providing to the groove a cross-section shaped like a segment of a circle greater than a semicircle generated around an axis perpendicular to the laminar planes, and a substantially non-deformable shock member fixed in said groove and partially overlapped by said wall portions, said shock receiving member having arcuate surfaces substantially conforming to said arcuate walls.

3. A plunger for use in an electromagnetic solenoid, said plunger comprising a plurality of ferromagnetic laminations having corresponding preformed slots at one end thereof, said laminations having edges forming a surface at one end of the plunger, means securing said laminations together with said slots in matching relation forming a groove in and open to said surface and crosswise of the laminae, said groove having defining side wall means which project inwardly at the top of the groove, and a substantially non-deformable shock receiving member fixed in said groove and partially overlapped by said inwardly projecting side wall means.

4. An electromagnetic translating device comprising relatively movable stator and armature members, at least one of said members comprising side plates and a plurality of laminations therebetween, said one member having a surface formed by edges of the laminae and being fabricated to provide a groove in and open to said surface and crosswise of the laminae, said groove extending to said side plates, and a substantially non-deformable shock member fixed in said groove and extending the length of the groove, said groove being defined by a wall having inwardly projecting portions at the mouth of the groove for partially overlapping the shock member to prevent the shock member from falling out of the groove.

5. An electromagnetic translating device comprising relatively movable stator and armature members, one of said members comprising a plurality of contiguous laminations having a spot at one end thereof, a surface formed by edges of the laminae, said laminations being stacked with the slots coinciding to form a groove in and open to said surface and crosswise of the laminae, and a substantially nondeformable shock member in said groove, said shock member being insertable through said slots in a direction perpendicular to the plane of said laminations during a stage in the fabrication of said laminated member, said groove having defining side wall means which project inwardly at the mouth of the groove, portions of said shock member being overlapped by said inwardly projecting side wall means to prevent said shock member from falling out of the groove.

6. An electromagnetic translating device comprising relatively movable stator and armature members, one of said members comprising a plurality of contiguous laminations having a slot at one end thereof, a surface formed by edges of the laminae, said laminations being stacked with the slots coinciding to form a groove in and open to said surface and crosswise of the laminae, and a substantially non-deformable shock member in said groove, said shock member and said slots having corresponding contours allowing assembly of the shock member and laminations by movement of the shock member through the slots in a direction perpendicular to the laminar plane, said groove having side walls, at least one of which projects toward the other at the mouth of the groove, a portion of said shock member being overlapped by said projecting wall to prevent said shock member from falling out of said groove.

7. An armature for use in an electromagnetic translating device comprising a plurality of contiguous laminations each with a slot at one end thereof, a surface formed by edges of the laminae, said laminations being stacked with the slots coinciding to form a groove in and open to said surface and crosswise of the laminae, and a substantially non-deformable shock member in said groove, said shock member being insertable through said slots in a direction perpendicular to the plane of said laminations during a stage in the fabrication of said laminated member, said groove having defining side wall means which project inwardly at the mouth of the groove, portions of said shock member being overlapped by said inwardly projecting side wall means to prevent said shock member from falling out of the groove.

References Cited in the file of this patent

UNITED STATES PATENTS

| | | |
|---|---|---|
| 1,576,155 | Stevens | Mar. 9, 1926 |
| 1,723,607 | Dominguez | Aug. 6, 1929 |
| 2,493,386 | Cairns | Jan. 3, 1950 |
| 2,610,233 | Caldwell | Sept. 9, 1952 |
| 2,671,187 | Jencks | Mar. 2, 1954 |

FOREIGN PATENTS

| | | |
|---|---|---|
| 258,725 | Great Britain | Sept. 30, 1926 |
| 548,717 | Great Britain | Oct. 21, 1942 |